INVENTOR.
CHARLES G. RUSSELL JOHNSON

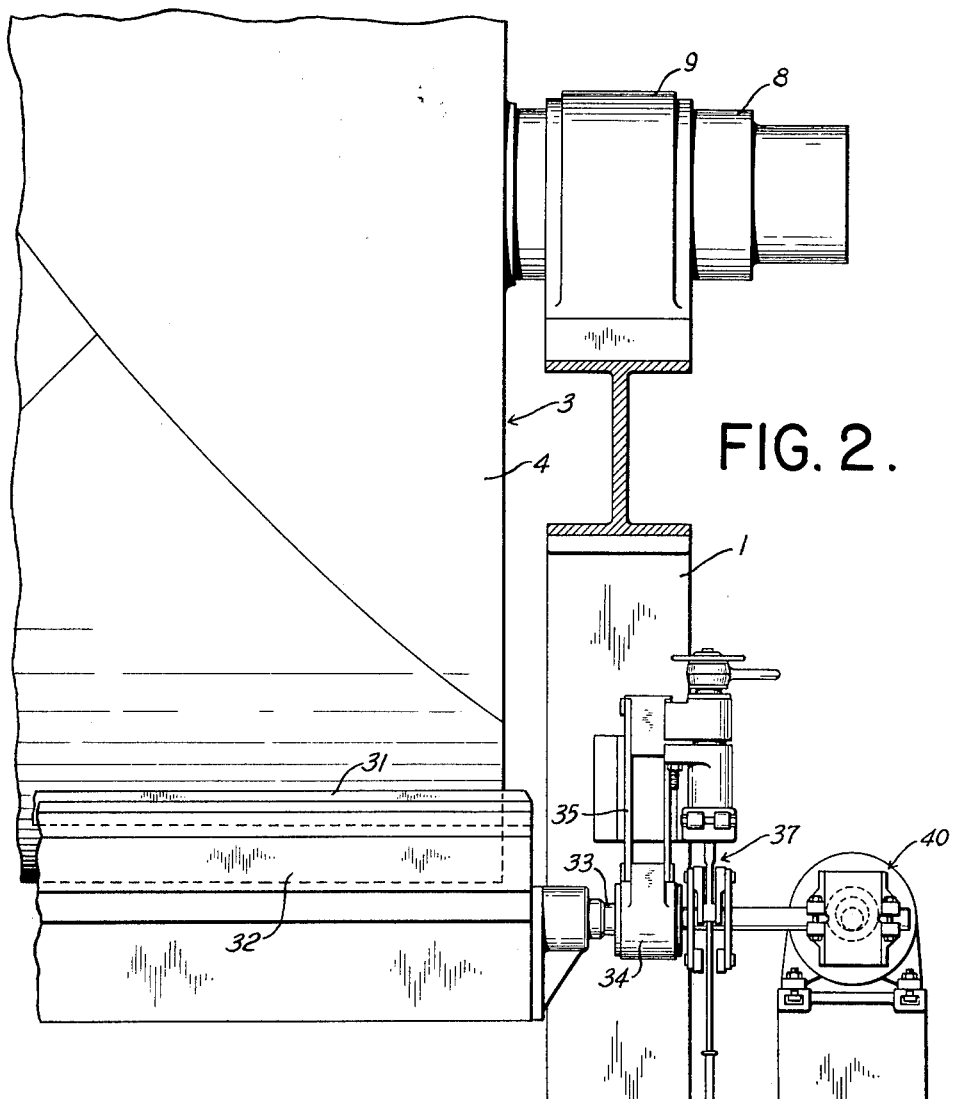
FIG. 2.
FIG. 8.
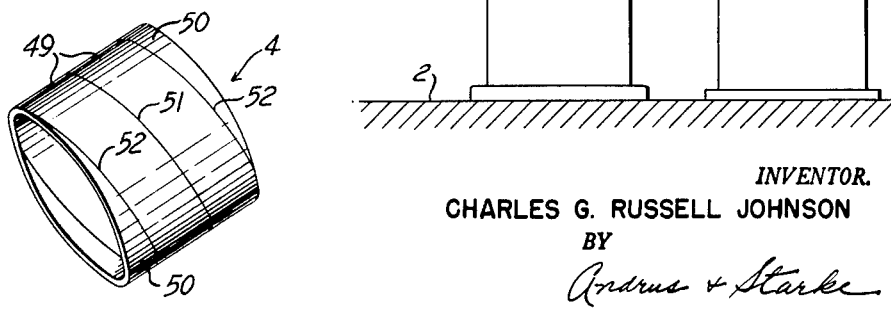
INVENTOR.
CHARLES G. RUSSELL JOHNSON
BY
Andrus & Starke
Attorneys Dec. 21, 1965 C. G. R. JOHNSON 3,224,084
METHOD OF MAKING A PRESSURE VESSEL FOR
USE IN A PAPER MAKING MACHINE
Original Filed Nov. 29, 1957 3 Sheets-Sheet 3

INVENTOR.
CHARLES G. RUSSELL JOHNSON
BY
Andrus & Starke
Attorneys

United States Patent Office 3,224,084
Patented Dec. 21, 1965

3,224,084
METHOD OF MAKING A PRESSURE VESSEL FOR USE IN A PAPER MAKING MACHINE
Charles G. Russell Johnson, Neenah, Wis., assignor to Kimberly-Clark Corporation, Neenah, Wis., a corporation of Delaware
Original application Nov. 29, 1957, Ser. No. 699,704, now Patent No. 3,052,039, dated Sept. 4, 1962. Divided and this application Dec. 28, 1961, Ser. No. 162,680
7 Claims. (Cl. 29—469)

This invention relates to a method of fabricating a welded pressure vessel and more particularly to a welded wrought drum drier for use in the manufacture of paper. This application is a division of application Serial No. 699,704, filed November 29, 1957, and entitled, Paper Making Machine, now Patent No. 3,052,039.

The dry creping of paper tissue is usually carried out with a "Yankee" type paper machine. In this type of machine, the wet paper web, after being couched from the forming wire and partially de-watered between felts, is pressed on to the surface of a large heated cylindrical drier and dried to the desired final moisture content within a single revolution of the drier. The dried paper web is removed from the surface of the drier by a doctor blade which rides on the drier surface. The Yankee type paper machine differs from that of a conventional Fourdrinier paper machine in that the Fourdrinier machine contains a large number of small driers and the paper is transferred from one drier to another by a series of rolls and canvas carriers.

The Yankee driers are cast or welded structures and generally have a diameter of 8 to 15 feet, a length of 10 to 15 feet and weigh in the neighborhood of 65 or 70 tons. During operation, the drum driers are subjected to both internal and external pressures. One or several pressure rolls bear against the external surface of the drier at the point where the wet sheet is first applied. These pressure rolls exert a force of from 200 pounds to 450 pounds or more per lineal inch across the entire face length of the drier.

In addition to this external pressure, a heating medium, such as steam under high temperatures and pressures, is introduced into the interior of the drier and serves to dry the paper web on the outer surface of the drier.

The temperature and pressure of the steam or other heating media and thus the drying rate are regulated by the code limitations for the drier itself. As the rate of heat transfer through the shell of the cylindrical drier is generally inversely proportional to the shell thickness, increasing the thickness of the shell to permit higher steam pressures and temperatures reduces the heat transfer through the shell and this, to an extent, nullifies the increased heating effect of the higher temperature steam. These factors generally determine the thickness of the drum drier shell and limit the operation of the cast drier shell, particularly those of the Yankee type, to operational steam pressures of less than 165 p.s.i.

Rolled or wrought materials, because of their increased mechanical properties over the cast material, permit the construction of thinner drying shells than a cast structure and thereby will result in a substantially higher rate of heat transfer.

While the use of a welded wrought structure will generally increase the production range over that of a similar cast structure, the welded structures present certain operational difficulties. While the welded drier shell is subjected to heat treatment techniques in an attempt to minimize the differences in mechanical properties between the parent metal and the weld areas, it has not been possible to provide the weld areas with identical properties to that of the parent metal. In view of the slight differences in mechanical properties between the weld areas and the parent or base metals, certain differences in the operational characteristics of the welded drum drier result.

The inner and outer surfaces of the drum drier shell are ground or machined to a desired degree of smoothness and tolerance to insure a uniform wall thickness for heat transfer and to permit the drier to rotate at high speeds. If a welded joint in the drier shell extends parallel to the axis of the shell, the doctor blade which rides on the surface of the rotating shell and is parallel to the axis of the drier is apt to abrade or gouge the shell surface due to the slight difference in wear resistance and hardness between the weld metal and the parent metal, and thereby cause chattering of the blade and non-uniformity of operation.

Furthermore, as the coefficient of thermal expansion of the weld area and the parent metal may differ slightly, distortion of the cylindrical surface of the drier may result due to the difference in temperature.

During operation, the inner surface of the shell is subjected to the hot steam while the outer surface is cooled by the wet paper web and this difference in temperature is apt to cause distortion and loss of concentricity in the cylindrical shell when the weld areas and the parent metal have different coefficients of thermal expansion. Any distortion in concentricity of the drier shell will cause uneven contact of the doctor blade and poor running of the pressure roll.

The weld metal and the parent metal also have slight differences in tensile strength and elongation properties. If the welded joint is parallel to the axis of the drier, the deflection of the shell as it passes under the pressure roll will vary and this will cause variations in nip pressure and operating problems. In addition, if the welded joint is parallel to the axis of the drier, the cyclic stressing of the drier as the drier rolls past the heavy pressure roll nip will be substantial.

The present invention is directed to a method of fabricating a welded drum drier shell in which the difficulties occurring because of the difference in mechanical properties between the weld area and the parent metal are minimized.

According to the invention, the welded drum drier shell is fabricated by welding a series of plates together such that the welds between the plates are disposed diagonally, at an angle greater than 5° to the axis of the drier shell. With this construction, the doctor blade and pressure roll will not bear on the entire weld seam at one time but will ride progressively along the diagonal seam as the drier rotates.

The diagonal weld pattern of the drier shell of the invention eliminates doctor blade gouging and chattering and uneven wear of the drier shell which are apt to occur in a conventional welded drier shell due to the differences in wear resistance and hardness between the welded joints and the parent metal.

Furthermore, the structure of the invention minimizes distortion of the drier shell due to the differences in thermal expansion and thermal conductivity between the weld areas and the parent metal. Any distortion in the cylindrical shell is confined to the area of a diagonal weld and does not extend continuously along an element of the shell or radially around its circumference, and this limited distortion is readily bridged by the pressure roll nip with greatly improved running of the drier.

As the weld seams extend diagonally or spirally, an entire weld seam does not pass under the pressure roll at a given time but instead, the pressure roll rides progressively along the weld seam. This minimizes the deflection of the drier shell and the magnitude of the cyclic stresses and results in a more uniform operation.

In the diagonally welded structure, the stress pattern is improved as no single weld is subjected to the entire hoop stress. The diagonally welded pattern also simplifies the manufacture of large diameter shells as it is easier to maintain a true cylindrical shape by welding spiral joints than by welding along an element parallel to the axis of the shell or around the circumference in a plane normal to the axis of the shell.

Other objects and advantages will appear in the course of the following description.

The drawings illustrate the best mode presently contemplated of carrying out the invention.

In the drawings:

FIG. 2 is a fragmentary end view of the drum drier structure shown in FIGURE 1;

FIG. 8 is a perspective view of a second embodiment of the invention showing a modified form of the welded pattern.

Figure 1:
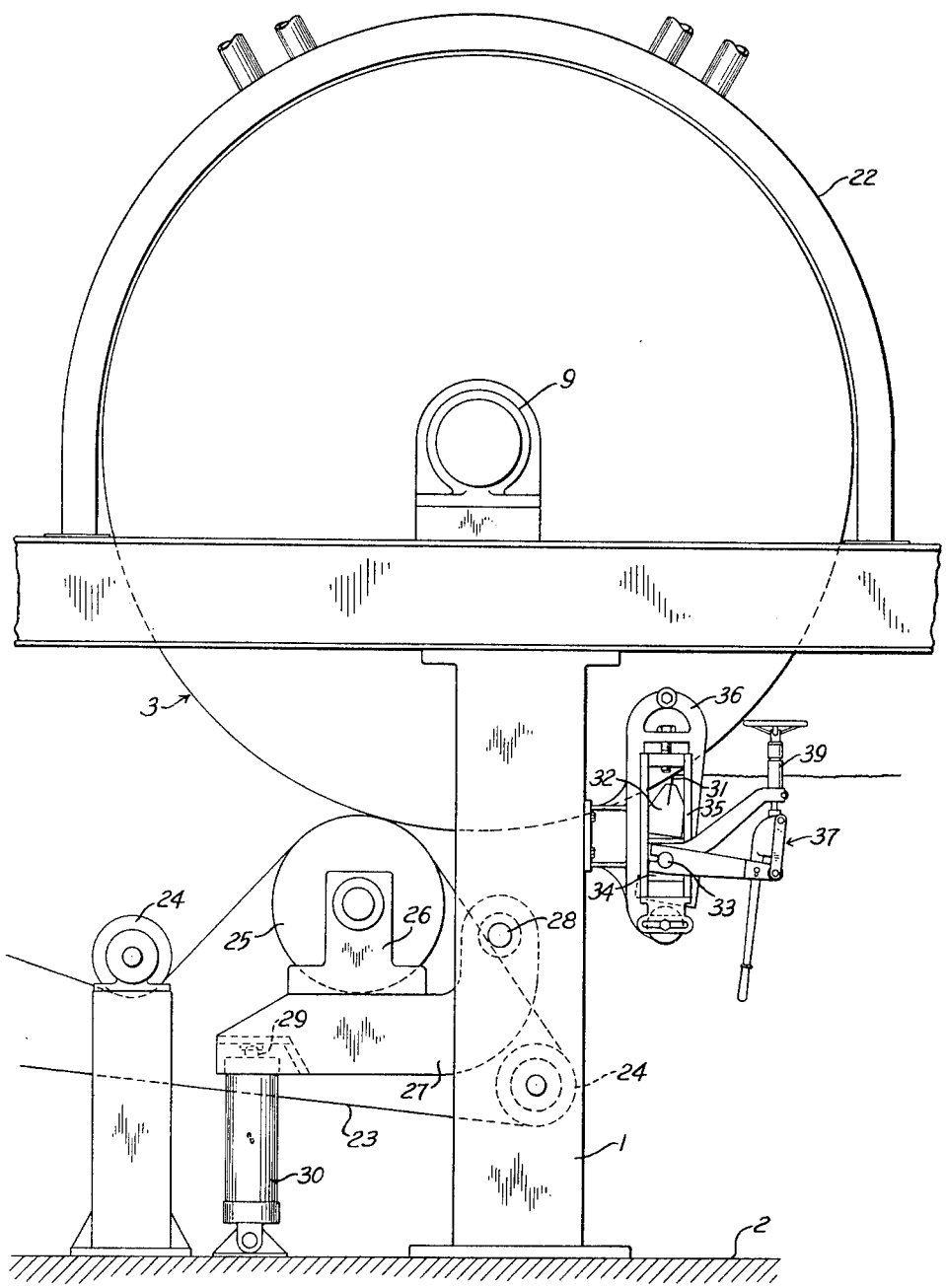
FIGURE 1 is a fragmentary side elevation of a paper making machine incorporating the drum drier of the invention.
Figure 3:
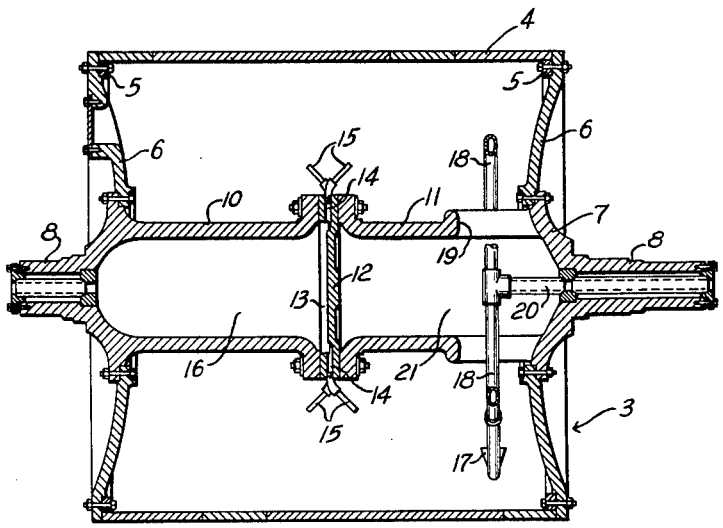
FIG. 3 is a longitudinal section of the drum drier.

The drawings illustrate a typical Yankee type paper machine which includes a supporting frame 1 which rests on a suitable foundation 2 and rotatably supports a drum drier 3. The wet paper web is adapted to be applied to the outer surface of the drum drier shell and during a single revolution of the drum drier, the paper web is dried and removed or scraped from the drier surface by a creping doctor.

The drum drier includes a generally cylindrical welded shell 4 having end flanges 5 which are bolted to heads 6. The heads 6 enclose the ends of the shell and are provided with aligned axial openings which receive the hollow shaft 7. The shell may be fabricated from any desired metal or alloy having the necessary mechanical properties for service, such as steel, aluminum, bronze or the like.

The drum drier is mounted for rotation by providing the ends of the shaft 7 with journals 8 which are rotatably supported in bearings 9 secured to frame 1.

The shaft 7 is formed of two hollows, axially aligned sections 10 and 11 which are separated by a separator plate 12. The separator plate 12 is provided with a thickened rim 13, and a series of openings 14 extend through the rim and communicate with the interior of the shell 4. Steam nozzles 15 are threaded into the openings 14 and serve to distribute steam from the interior 16 of the shaft section 10 to the interior of the shell 4.

To remove the steam condensate from the drier, a pair of scoops 17 are secured to the ends of pipes 18 which extend radially through openings 19 in the shaft section 11. The inner ends of the pipes 18 are connected to a conduit 20 which extends outwardly through the passage 21 in shaft section 11 to the exterior. With this construction, the scoops 17 serve to scoop up the steam condensate from the interior of the cylindrical shell 4 and discharge the same through the conduit 20 to the exterior.

The drum drier 3 is rotated by a conventional drive mechanism, not shown, which is attached to the end of the shaft 7 by a suitable gear or pulley arrangement.

To provide additional heat to dry the paper web on the surface of the shell 4, a heating hood 22 is secured to frame 1 and extends around the upper portion of the shell 4. Suitable hot air inlets and outlets are provided in the hood for the entry and discharge of the air or other heating medium.

The wet paper web to be dried is carried by a felt web 23 which travels around felt rolls 24. The paper web is forced against the surface of the drier shell 4 by a pressure roller 25 which is rotatably mounted in brackets 26 attached to arm 27. The arm 27 is pivoted at 28 to the frame 1 and the pressure roller 25 is forced against the surface of the drier shell 4 by a ram 29 of a hydraulic cylinder 30 which bears against the arm 27.

The dried paper web is removed from the surface of the drier shell by a creping doctor, which includes a doctor blade 31 which is removably secured within the doctor blade holder 32. The ends of the holder 32 are provided with shafts 33 which are rotatably mounted within guide blocks 34. The blocks 34, in turn, are each slidably mounted within a slide assembly 35 attached to pivot frame 36 pivotally carried by frame 1. Through the slide arrangement provided by guide blocks 34 and slide assembly 35, the vertical position of the doctor blade 31 can be varied, as desired, to obtain the best creping angle.

The doctor blade holder 32 and blade 31 are pivoted by a toggle mechanism 37 which is attached through lever arm 38 to one of the shafts 33. In addition, a spring loading mechanism 39 is connected through the toggle mechanism 37 to provide a resilient contact for the doctor blade against the surface of the drier shell 4.

In addition to the vertical and pivotal adjustment for doctor blade 31, the doctor blade is adapted to oscillate in a direction generally parallel to the axis of the shell 4. The oscillating motion is provided by an eccentric drive, shown generally at 40, which is connected to one of the shafts 33. The oscillating motion is permitted by a loose fit between the pivot frame 36 and frame 1 and permits the doctor blade to move back and forth across the shell surface as the shell rotates to prevent uneven wear of the doctor blade and of the drier during operation.

Figure 4:
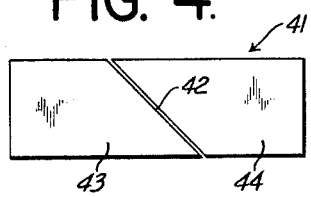
FIG. 4 is a top plan view of a plate from which the drum drier is fabricated, showing the cutting of the plate into two segments.

According to the invention, the drier shell 4 is fabricated from a series of generally rectangular rolled plates 41. As shown in FIG. 4, the rectangular plates 41 are initially cut diagonally at 42 to provide two halves or segments 43 and 44. The cut at 42 is made so as to divide the rectangular plate 41 into two generally equal segments of similar shape and surface area. The angle of the cut 42 with respect to the longitudinal side edge of the plate is greater than 5° and preferably within the range of 30° to 60°. It has been found that 45° is the optimum angle of the cut 42 in order to provide the completed shell with minimum wear, maximum strength, freedom from distortion and general stress balance.

Figure 5:
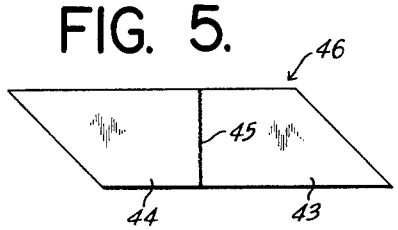
FIG. 5 is a view similar to FIG. 4 showing two plate segments welded together to form a parallelogram-shaped section.

After severing the rectangular plates into the segments 43 and 44, the edges of the segments are scarfed for welding and the segments are reversed in position so that the square ends of the segments are in abutting relation. The aligned ends of the segments are welded together at 45 to provide a generally parallelogram-shaped section 46, as shown in FIG. 5.

Figure 6:
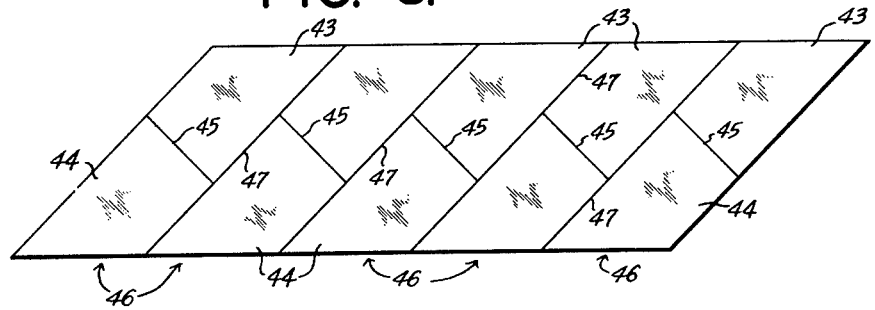
FIG. 6 is a view similar to FIG. 4 showing the sections welded together to form the plate pattern.

A series of the parallelogram-shaped sections 46 are then arranged with the diagonal edges in alignment and the longitudinal side edges in opposed relation, as shown in FIG. 6, to form a larger plate pattern. The number of sections 46 in the pattern depend upon the diameter of the shell to be fabricated. The abutting side edges of the sections 46 are then welded together, as at 47. The large parallelogram-shaped pattern is then rolled into cylindrical form and the free ends are welded along line 48 to provide the generally cylindrical welded structure shown in FIG. 7.

After welding, the cylindrical shell 4 is heat treated to minimize the differences in mechanical properties between the plates and the weld seams and then fitted to the component parts of the drier. The inner and outer surfaces of the drier shell are then machined to provide a uniform wall thickness for heat transfer.

For the fabrication of smaller diameter shells, it is contemplated that the parallelogram-shaped pattern can be formed as a single piece and the free ends can then be welded as at 48 to provide the cylindrical shell having a single diagonal weld.

Figure 7:
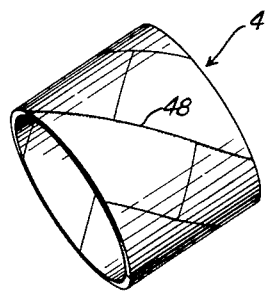
FIG. 7 is a perspective view of the completed welded shell.

Each of the welds 45, 47 and 48, as best shown in FIG. 7, is disposed at an angle greater than 5° to the axis of the shell. With this construction, the doctor blade 31, which bears on the surface of the shell, will not contact the entire weld seam at one particular time in the rotation of the shell, but the contact area between the blade and the weld will instead ride along the generally spiral weld seam. With this welded pattern, the blade 31 will be in contact with at least one of the weld seams at any given time during the rotation of the shell.

The welded wrought drier shell of the invention serves to substantially minimize the difficulties encountered by the difference in physical properties between the parent metal and the weld seams.

As the weld seams extend diagonally to the axis of the shell and the doctor blade rides progressively along the seam, the wear on the shell surface will be substantially uniform. This uniformity of wear is critical in that the drier shell concentricity must generally be maintained within a tolerance of plus or minus 0.003 inch. This high degree of precision is necessary to maintain the desired crown and uniform pressure contact across the face of the drier shell and also to permit uniform creping of the sheet from the shell surface. If localized wear causes portions of the shell surface to fall outside of this 0.003-inch limit, the drier shell surface must be re-ground at a substantial expense and loss of production.

In addition, the girth or hoop stress in a vessel subjected to internal pressure is approximately twice that of the longitudinal stress and thus a vessel having a longitudinal weld seam is designed to accommodate the hoop stress. However, with the diagonal welds in which there are no welds subjected completely to hoop stress, the maximum tensile stress to which a weld is subjected, perpendicular to the course of the weld, is less than the hoop stress and thus the welds can be designed for lesser maximum tensile stresses. In view of this, a weld pattern in which all of the welds extend at an angle of 45° to the axis of the shell, provides the optimum mechanical properties and the greatest freedom from distortion. With 45° welds, all of the welds are subjected to the identical internal stresses, and a symmetry of stress is obtained.

The welded pattern of the invention greatly improves the general balance, uniformity of wear, freedom from distortion and the uniformity of internal stress in a drier shell.

FIG. 8 shows a second embodiment of the invention having a modified welding pattern. In this embodiment, the cylindrical shell 4 is fabricated from a plurality of rings 49 and a pair of wedge-shaped end sections 50 which are welded to the outer end of the rings 49.

Each of the rings 49 is a continuous member, and the ends of each ring lie in parallel planes extending at an angle greater than 5° to the axis of the ring. As shown in FIG. 8, the opposed ends of rings 49 are joined together by welds 51 and welds 52 join the tapered end sections 50 to the outer ends of the respective rings. The welds 51 and 52 are all positioned at an angle greater than 5° to the axis of the shell, as in the case of the first embodiment.

To insure uniform wear of the doctor blade and the shell surface, any given point on the doctor blade should be contacted by at least one of the welds 51 and 52 during rotation of the shell in operation.

While the above description is directed to a Yankee-type drum drier, it is contemplated that the welded shell of the invention can be employed in any situation where a rotating shell is subjected to the action of a pressure member, scraping blade or the like. This includes driers for use in all creping operations, such as dry creping, semi-creping and wet creping, for in each case, including the manufacture of machine glazed paper, the drier is subjected to the scraping action of either a creping doctor or a cleaning doctor. The welded shell of the invention is adapted to withstand a wide range of internal and external stresses. Moreover, it may be used with various heating or cooling media, such as hot vapors, including steam, gases, products of combustion and liquids such as oil, heat stabilized ortho di chloro benzene or similar compounds, molten metal, brine and the like.

Various modes of carrying out the invention are contemplated as being within the scope of the following claims particularly pointing out and distinctly claiming the subject matter which is regarded as the invention.

I claim:

1. A method of making a welded wrought drum drier shell for use in a paper making machine comprising, cutting a generally rectangular metal plate having a pair of opposite side edges and a pair of opposite end edges at an angle greater than 5° to said side edges to provide a pair of plate segments, reversing the plate segments and welding said end edges together to form a generally parallelogram shaped section having a pair of opposite side edges and a pair of opposite diagonal edges, aligning the corresponding diagonal edges of a series of sections and welding the side edges of adjacent sections to form a generally parallelogram shaped pattern, forming the pattern to cylindrical shape with the axis of the cylindrical shaped pattern being disposed normal to a plane extending through the aligned diagonal edges of said sections, welding the adjacent side edges of the end sections in said pattern together to form an integral welded shell, and machining the outer surface of the welded shell to provide a smooth periphery on which a pressure member is adapted to ride.

2. A method of making a welded wrought drum drier shell for use in a paper making machine comprising, cutting a generally rectangular metal plate having a pair of opposite side edges and a pair of opposite end edges at an angle of approximately 45° to said side edges to provide a pair of plate segments of substantially equal surface area, reversing the plate segments and welding said end edges together to form a generally parallelogram shaped section having a pair of opposite side edges and a pair of opposite diagonal edges, aligning the corresponding diagonal edges of a series of sections and positioning the side edges of adjacent sections in opposed relation, welding the opposed side edges of adjacent sections to form a generally parallelogram shaped pattern, forming the pattern to cylindrical shape with the axis of the cylindrical shaped pattern being disposed normal to a plane extending through the aligned diagonal edges of said sections, welding the adjacent side edges of the end sections in said pattern together to form an integral welded shell having the welded joints extending at said angle of approximately 45° to the axis of the shell, machining the outer surface of the welded shell to provide a smooth periphery on which a pressure member is adapted to ride, and assembling a journalling member with each end of the welded shell.

3. A method of making a pressure vessel for use in a paper making machine comprising, fabricating a parallelogram shaped metal plate having a pair of opposed substantially parallel side edges and a pair of opposed substantially parallel diagonal edges disposed at an acute angle to said side edges, forming the plate to cylindrical shape with the diagonal edges being in opposed relation, welding the opposed diagonal edges together to form an integral welded shell, machining the outer surface of the welded shell to provide a smooth cylindrical periphery on which a pressure member is adapted to ride, and assembling a journalling member with each end of the shell.

4. A method of making a pressure vessel for use in a paper making machine comprising, fabricating a parallelogram shaped metal plate having a pair of side edges and a pair of end edges disposed at an angle greater than 5° to said side edges, rolling the plate in a direction parallel to the side edges to form a generally cylindrical shaped shell with the end edges being located in abutting relation, welding the abutting end edges to form an integral welded shell, machining the outer surface of the welded shell to provide a smooth cylindrical periphery, and assembling a journalling member with each end of the welded shell.

5. A method of making a drum drier shell to be used in a paper making machine comprising, rolling a generally parallelogram shaped metal plate to cylindrical shape, welding the ends of the plate together to provide a cylindrical shell with the welds extending at an angle in the range of 30° to 60° to the axis of the shell, machining the outer surface of the welded shell to provide a smooth periphery on which a pressure member is adapted to ride, assembling a journalling member with each end of the welded shell, and mounting a pressure member in engagement with the outer surface of the shell and in a plane substantially parallel to the axis of said shell.

6. A method of making a welded wrought drum drier shell for use in a paper making machine comprising, cutting a generally rectangular metal plate having a pair of opposite side edges and a pair of opposite end edges at an angle greater than 5° to said side edges to provide a pair of plate segments, reversing the plate segments and welding said end edges together to form a generally parallelogram shaped section having a pair of opposite side edges and a pair of opposite diagonal edges, aligning the corresponding diagonal edges of a series of sections and welding the side edges of adjacent sections to form a generally parallelogram shaped pattern, rolling the pattern in a direction parallel to said aligned diagonal edges to form a cylindrical shell, welding the adjacent side edges of the end sections in said pattern together to form an integral welded shell, and machining the outer surface of the welded shell to provide a smooth, cylindrical periphery on which a pressure member is adapted to ride.

7. A method of making a cylindrical shell for use in a paper making machine, comprising forming a series of parallelogram shaped metal plates of substantial thickness with the ends extending at an acute angle with respect to the sides, aligning the corresponding ends of the plate and welding the side edges of adjacent plates to form a generally parallelogram shaped pattern, rolling the pattern in a direction parallel to said aligned ends to form a cylindrical shell, welding the ends of the pattern together to form a welded cylindrical shell, and machining the outer surface of the welded shell to provide a smooth periphery on which a pressure member is adapted to ride.

References Cited by the Examiner
UNITED STATES PATENTS

| | | | |
|---|---|---|---|
| 677,712 | 7/1901 | Stapf | 138—154 |
| 1,752,061 | 3/1930 | Cameron | 29—481 X |
| 1,813,859 | 7/1931 | Lawrence | 113—35 X |
| 1,916,051 | 6/1933 | Jagschitz | 113—120 |
| 1,942,304 | 1/1934 | Mylting | 29—477.3 X |
| 2,352,220 | 6/1944 | Overton | 34—112 X |
| 2,564,391 | 8/1951 | Burns. | |
| 2,866,261 | 12/1958 | Macku | 29—429 |

WHITMORE A. WILTZ, *Primary Examiner.*

CHARLIE T. MOON, *Examiner.*